(12) United States Patent
Lee et al.

(10) Patent No.: US 7,564,971 B2
(45) Date of Patent: Jul. 21, 2009

(54) APPARATUS AND METHOD FOR PERFORMING MONTGOMERY TYPE MODULAR MULTIPLICATION

(75) Inventors: Kyung-Hee Lee, Yongin-si (KR); Bum-Jin Im, Suwon-si (KR); Mi-Suk Huh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 614 days.

(21) Appl. No.: 10/800,181

(22) Filed: Mar. 12, 2004

(65) Prior Publication Data

US 2004/0179681 A1    Sep. 16, 2004

(30) Foreign Application Priority Data

Mar. 14, 2003    (KR) .................. 10-2003-0016100

(51) Int. Cl.
    *H04K 1/00*    (2006.01)
(52) U.S. Cl. ..................... 380/30; 708/551; 708/620
(58) Field of Classification Search .......... 380/28, 380/30; 708/200, 491, 551, 620, 625; 713/183
    See application file for complete search history.

(56) References Cited

U.S. PATENT DOCUMENTS

| | | | | |
|---|---|---|---|---|
| 5,247,605 | A | * | 9/1993 | Engeler ..................... 706/22 |
| 5,513,133 | A | * | 4/1996 | Cressel et al. ............... 708/620 |
| 5,847,981 | A | * | 12/1998 | Kelley et al. ................ 708/603 |
| 6,185,596 | B1 | | 2/2001 | Hadad et al. |
| 6,317,769 | B1 | * | 11/2001 | Kobayashi et al. .......... 708/491 |
| 6,658,442 | B1 | * | 12/2003 | Pomet ........................ 708/491 |
| 6,668,267 | B1 | * | 12/2003 | Pomet ........................ 708/492 |
| 6,963,977 | B2 | * | 11/2005 | Chen et al. .................. 713/183 |

(Continued)

FOREIGN PATENT DOCUMENTS

EP    1191740    3/2002

(Continued)

OTHER PUBLICATIONS

Rivest et al., "A Method of Obtaining Digital Signatures and Public-Key Cryptosystems", Communications of the ACM, Feb. 1978, vol. 21, No. 2, pp. 120-126.

(Continued)

*Primary Examiner*—Kambiz Zand
*Assistant Examiner*—Yonas Bayou
(74) *Attorney, Agent, or Firm*—McNeely Bodendorf LLP

(57) ABSTRACT

A signal processing apparatus for performing modular multiplication for use in a signal processing system includes a first logic for outputting a signed multiplicand by selectively performing a one's complementary operation on a multiplicand according to a Booth conversion result of a multiplier in modular multiplication; a second logic for outputting a modulus which is signed in the modular multiplication based on a carry input value Carry-in of a current clock, determined from a carry value cin for correction of a previous clock, and on a sign bit of the multiplicand; and a third logic for receiving the signed multiplicand and the signed modulus, and calculating a result value of the modular multiplication by iteratively performing a full addition operation on a carry value C and a sum value S of the full addition operation, found at the previous clock. The present invention provides a high-speed modular multiplication apparatus with fewer gates and reduced power consumption.

18 Claims, 10 Drawing Sheets

U.S. PATENT DOCUMENTS

| | | | | |
|---|---|---|---|---|
| 2001/0023425 | A1* | 9/2001 | Oberman et al. | 708/620 |
| 2002/0172355 | A1 | 11/2002 | Lu et al. | |
| 2002/0194237 | A1 | 12/2002 | Takahashi et al. | |
| 2003/0163503 | A1* | 8/2003 | Nguyen | 708/625 |
| 2004/0252829 | A1* | 12/2004 | Son | 380/30 |
| 2005/0198093 | A1* | 9/2005 | Son | 708/625 |
| 2005/0210086 | A1* | 9/2005 | Lutz et al. | 708/200 |
| 2006/0098824 | A1* | 5/2006 | Mao | 380/282 |

FOREIGN PATENT DOCUMENTS

| | | |
|---|---|---|
| JP | 62-154029 | 9/1987 |
| JP | 64-082125 | 3/1989 |
| WO | WO 02/073450 | 9/2002 |

OTHER PUBLICATIONS

Montgomery, "Modular Multiplication Without Trial Division", Mathematics of Computation, vol. 44, No. 170, Apr. 1985, pp. 519-521.

Dusse et al., "A Crytographic Library for the Motorola DSP56000", Advances in Cryptology—Eurocrypt '90, pp. 230-244.

Bosselaers et al., "Comparison of Three Modular Reduction Functions", Advances in Cryptology—Crypto '93, pp. 175-186.

Yan Shu et al., VLSI Implementation of RSA Cryptosystem based on the Booth-Encoded Montgomery Module, Jun. 2002.

High Speed Operation of Computer, Jan. 9, 1980.

Jin-Hua Hong et al., *Radix-4 Modular Multiplication and Exponentiation Algorithms for the RSA Public-Key Cryptosystem*, 2000 IEEE, pp. 565-570.

Taek-Won Kwon et al., *Two Implementation Methods of a 1024-Bit RSA Cryptoprocessor Based on Modified Montgomery Algorithm*, 2001 IEEE, pp. 650-653.

* cited by examiner

APPARATUS AND METHOD FOR PERFORMING MONTGOMERY TYPE MODULAR MULTIPLICATION

PRIORITY

This application claims priority to an application entitled "APPARATUS AND METHOD FOR PERFORMING MONTGOMERY TYPE MODULAR MULTIPLICATION", filed in the Korean Intellectual Property Office on Mar. 14, 2003 and assigned Serial No. 2003-16100, the contents of which are hereby incorporated by reference.

BACKGROUND OF THE INVENTION

1. Field of the Invention

The present invention relates generally to the field of cryptography, and more particularly to an apparatus and method for performing a Montgomery type modular multiplication for use in the encryption/decryption on information and digital signature technology.

2. Description of the Related Art

In communication systems using smart cards and cyber money for electronic commerce, mobile communication devices such as cellular telephones, small-sized computers, etc., it is desirable to transport information (electronic text or data) safely by encrypting/decrypting the information or conducting a digital signature process for the information. Here, the term "digital signature" refers to a technique that "signs" electronic texts with an electronic signature in an increase of the number of Internet users and the frequent transmission of personal information over the Internet, there is a vital need for safe transmission of information through unsecured channels.

Various proposed algorithms such as RSA (Rivest-Shamir-Adleman), ElGamal, Schnorr, etc., have been employed for the encryption/decryption techniques and the digital signature technology using a public key system. The RSA algorithm-based ISO (International Standard Organization)/IEC (International Electrotechnical Commission) 9796 has been adapted as an international standard of these algorithms, DSA (Digital Signature Standard) as a modification of ElGamal has been adapted in the U.S.A., GOSSTANDART (commonly abbreviated as "GOST") has been adapted in Russia, and KC-DSA has been adapted in Korea. However, various communication systems in current use have adapted many PKCSs (Public Key Cryptography Standards). The above-mentioned algorithms require operation for modular exponentiation, $m^e$ mod N, which incorporates repetitive performance of modular multiplication, A·B mod N.

Many algorithms which perform modular exponentiation and modular multiplication required to generate-verify a digital signature based on a public key cipher such as the RSA have been proposed, for example, R. L. Rivest et al, "A Method For Obtaining Digital Signatures And Public-Key Crytosystems," Communications of the ACM, Vol. 21, pp. 120-126, 1978; P. L. Montgomery, "Modular Multiplication Without Trial Division," Math. Of Comp., Vol. 44, No. 170, pp. 519-521, 1985; S. R. Dusse and B. S. Kaliski Jr., "A Cryptographic Library For The Motorola DSP5600," Proc. Eurocrypto '90, pp. 230-244, 199?; and Spronger-Verlag, A. Bosselaers, R. Govaerts and J. Vandewalle, "Comparison Of Three Modular Reduction Functions," Advances in Cryptology-CRYPTO '93, pp. 175-186, 1993. From the paper by D. R. Stinson, "Cryptography", CRC Press, 1995, of these algorithms, the Montgomery algorithm has been found to be the most efficient in view of calculation efficiency in modular multiplication for modular exponentiation required for various algorithms, but it is not an efficient algorithm for simple modular multiplication. U.S. Pat. No. 6,185,596 discloses an example of an apparatus implemented by the Montgomery algorithm.

As mentioned above, many algorithms and architectures have been proposed for the public key encryption/decryption and electronic signature. However, since modular multiplication apparatuses according to most of the proposed algorithms and architectures are designed for high-speed public key encryption/decryption, they have a disadvantage in that a great number of gates are required and a large amount of power is consumed. Therefore, they are not suitable for a resource-limited environment like in a smart card.

SUMMARY OF THE INVENTION

Therefore, the present invention has been made in view of the above problems, and it is an object of the present invention to provide a modular multiplication apparatus and method for high-speed encryption/decryption and electronic signature in a mobile communication environment including smart cards and mobile terminals.

It is another object of the present invention to provide a modular multiplication apparatus and method with fewer gates for high-speed encryption/decryption and electronic signature in a mobile communication environment including smart cards and mobile terminals.

It is still another object of the present invention to provide a modular multiplication apparatus and method, which enables encryption/decryption and electronic signature with reduced power in a mobile communication environment including smart cards and mobile terminals.

According to one aspect of the present invention, there is provided a signal processing apparatus for performing modular multiplication for use in a signal processing system. The apparatus includes a first logic for outputting a signed multiplicand by selectively performing a one's complementary operation on a multiplicand according to a Booth conversion result of a multiplier in modular multiplication; a second logic for outputting a modulus which is signed in the modular multiplication based on a carry input value Carry-in of a current clock, determined from a carry value cin for correction of a previous clock, and on a sign bit of the multiplicand; and a third logic for receiving the signed multiplicand and the signed modulus, and calculating a result value of the modular multiplication by iteratively performing a full addition operation on a carry value C and a sum value S of the full addition operation, found at the previous clock.

According to another aspect of the present invention, there is provided a signal processing method for performing modular multiplication for use in a signal processing system. The method includes outputting a signed multiplicand by selectively performing a one's complementary operation on a multiplicand according to a Booth conversion result of a multiplier in modular multiplication; finding a carry input value Carry-in of a current clock determined from a carry value cin for correction of a previous clock; outputting a modulus which is signed in the modular multiplication based on the carry input value and a sign bit of the multiplicand; and receiving the signed multiplicand and the signed modulus, and calculating a result value of the modular multiplication by iteratively performing a full addition operation on a carry value C and a sum value S of the full addition operation, found at the previous clock.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
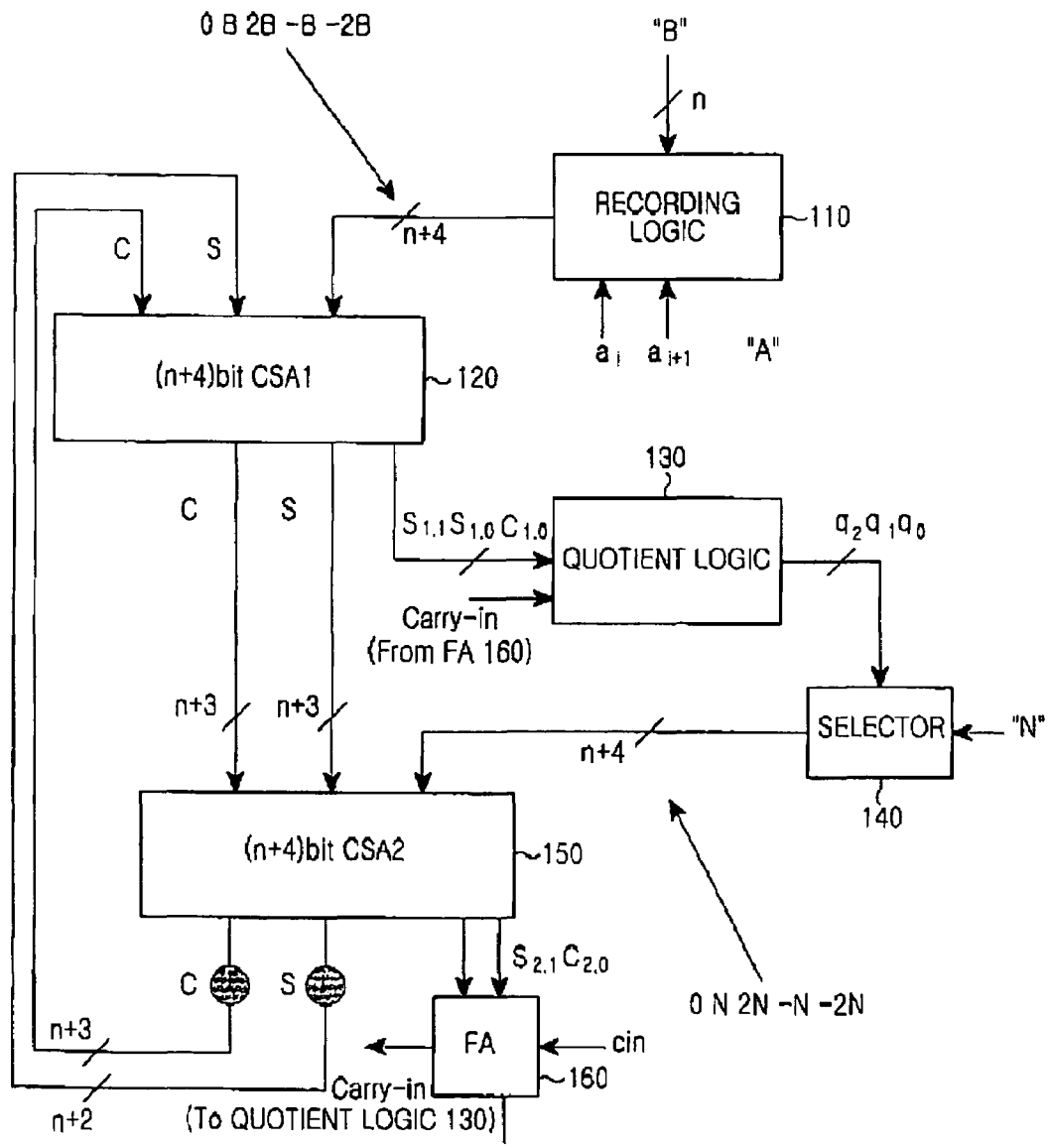
FIG. 1 is a block diagram showing a configuration of a modular multiplication apparatus in accordance with a first embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

A. Outline of the Invention

In the following description, the present invention discloses an apparatus and method for performing a modular multiplication, $A \cdot B \bmod N$, by using a Montgomery algorithm, where $$A = a_{n-1} \cdot 2^{n-1} + \ldots + a_1 \cdot 2 + a_0,$$

$$B = b_{n-1} \cdot 2^{n-1} + \ldots + b_1 \cdot 2 + b_0, \text{ and}$$

$$N = n_{n-1} \cdot 2^{n-1} + \ldots + n_1 \cdot 2 + n_0.$$

Here, A is a multiplier, B is a multiplicand, and N is a modulus, a bit size of each of which can be a large number, for example, 512 or 1024.

The modular multiplication, $A \cdot B \bmod N$, is implemented by two embodiments, which will be described. Each embodiment suggests a modular multiplication apparatus and method for calculating $A \cdot B \cdot R-1 \bmod N$ in m+2 clocks with A, B and N (where $R = 4^{m+2}$, m=n/2, $-N \leq A$ and B<N), each being n bits in length, being received as inputs. $A \cdot B \bmod N$ can be calculated by using a multiplication result by the suggested modular multiplication apparatus. The modular exponentiation, $m^e \bmod N$, which is required to perform RSA operation, can be derived from the calculated A B mod N. FIGS. 1 to 6 of the drawings are block diagrams showing the configuration of the elements of the modular multiplication apparatus in accordance with a first embodiment of the present invention, and FIGS. 7 to 13 are block diagrams showing the configuration of the elements of the modular multiplication apparatus in accordance with a second embodiment of the present invention. FIG. 14 is a block diagram of an IC card to which the modular multiplication apparatuses in accordance with the embodiments of the present invention are applicable.

Embodiments of the present invention provide modular multiplication apparatuses, which bits of the multiplier are sequentially shifted to generate a converted bit string, and a partial sum is calculated by expressing it as a one's complementary number according to a value of the converted bit string. In contrast with conventional modular multiplication apparatuses wherein only a single lower bit generated by sequentially shifting bits of the multiplier is processed, the present invention allows the multiplication to be performed at higher speeds by processing two lower bits of the multiplier. The modular multiplication apparatuses in accordance with the embodiments of the present invention include modified conversion logics and other elements configured in compliance with the modified-conversion logics for performing the modular multiplication operation according to the Montgomery algorithm.

B. First Embodiment

B-1. Configuration of the Invention

FIG. 1 is a block diagram showing a configuration of a modular multiplication apparatus in accordance with the first embodiment of the present invention.

Referring to FIG. 1, the modular multiplication apparatus includes conversion logic 110, a Referring to FIG. 1, the modular multiplication apparatus includes conversion logic 110, a first carry save adder (hereinafter, abbreviated as "CSA1") 120, a quotient logic 130, selector 140, a second CSA ("CSA2") 150, and a full adder (FA) 160. The modular multiplication apparatus is a hardware device for calculating $A \cdot B \cdot R^{-1} \bmod N$ in m+2 clocks with A, B and N (where $R = 4^{m+2}$, m=n/2, $-N \leq A$, and B<N), each having n input bits according to a Montgomery algorithm. The modular multiplication apparatus calculates $A \cdot B \cdot 2^{-(n+4)} \bmod N$. Herein, A is called a multiplier, B is called a multiplicand, and N is called a modulus.

Each of the CSAs 120 and 150 is composed of (n+4) full adders in parallel, each of which has a 3 bit input and outputs a carry bit and a sum bit. The logic 110 performs a modified Booth converted value and its corresponding selective one's complementary function based on the multiplier A and outputs one of the values 0, ±B, and ±2B as a signed extension bit of the (n+4) bits. The quotient logic 130 has as its inputs a least significant bit (LSB) carry value $C_{1,0}$ and two sum LSB bits $S_{1,1}$ and $S_{1,0}$ from the CSA1 120, a carry input value 'carry-in' output from the full adder 160, and a sign bit (B sign of FIG. 4) of B, and outputs $q_2q_1q_0$ of 3 bits, which is a value for determining a multiple of the modular reduction. The selector 140, which can be implemented by multiplexers (MUXs), selects and outputs one of 0, N, 2N and –N (see FIG. 1) based on a determined value of q (i.e. $q_2q_1q_0$ of 3 bits). The full adder 160 performs full add operation, with two bits $S_{2,1}$ and $C_{2,0}$ output from the CSA2 150 and a carry value cin for correction of the current clock as its inputs, and provides a result value of the full add to the next clock as a carry-in signal to be used in the quotient logic 130.

Figure 2:
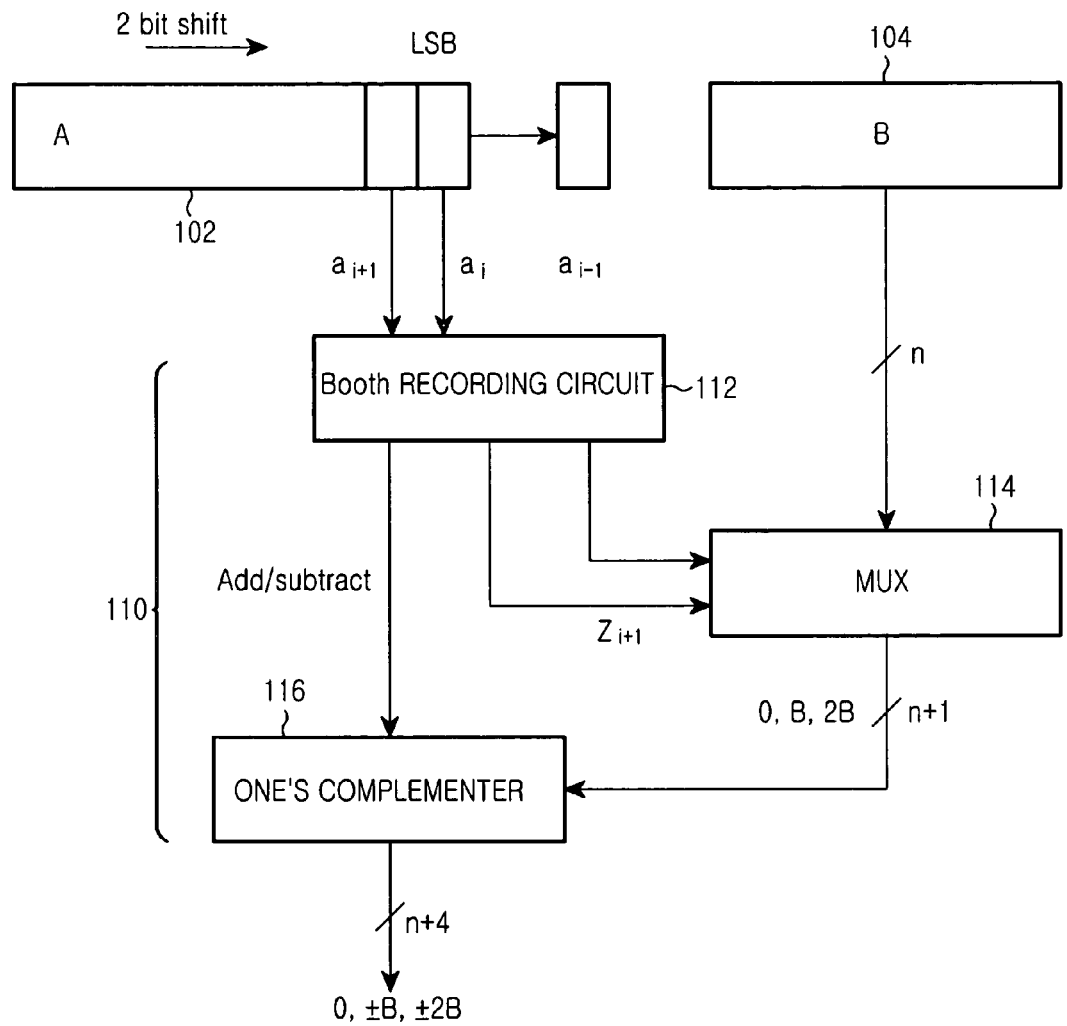
FIG. 2 is a block diagram showing a detailed configuration of a conversion circuit shown in FIG. 1.

Although not shown in detail in FIG. 1 the modular multiplication apparatus includes temporary storing registers for storing carry values and sum values, which are the outputs of the CSA1 120 and CSA2 150, respectively, for each clock, and a carry propagation adder for adding values stored in the temporary storing registers and outputting a resultant value as a result of FIG. 2 is a block diagram showing a detailed configuration of the conversion logic 110 shown in FIG. 1.

Referring to FIG. 2, the conversion logic 110 Booth-converts two lesser bits ($a_{i+1}, a_i$) of the multiplier A and a reference bit $a_{i-1}$, with bits of the multiplier A being sequentially shifted according to the Booth-converted result value $z_{i+}$ and outputs signed binary numbers of (n+4) bits. In FIG. 1, the Booth-converted result value $z_{i+1}$ is shown separately for individual output bits, for example, shown as $z_{i+1}[2]$, $z_{i+1}[1]$, $z_{i+1}[0]$. Herein, the multiplicand B is multiplexed according to $z_{i+1}[1]$ and $z_{i+1}[0]$, and an output of a multiplexer (MUX) 114 is selectively signed according to $z_{i+1}[2]$ being input to a one's complementer 116. Therefore, the $z_{i+1}[2]$ will be called a sign bit. For this purpose, a shift register 102 for sequentially shifting bits of the multiplier A to generate a shifted bit string and a register 104 for storing the multiplicand are provided at the front stage of the conversion logic 110. The onversion logic 110 also includes a Booth conversion circuit 112, a multiplexer (MUX) 114, and a one's complementer 116. The Booth conversion circuit 112 Booth converts two lesser bits $a_{i+1}$ and $a_i$ of the generated bit string and a reference bit $a_{i-1}$, and outputs, for example, a 3-bit result value ($z_{i+1}[2]$, $z_{i+1}[1]$, $z_{i+1}[0]$: $z_{i+1}$). The multiplexer 114 multiplexes the multiplicand B according to the result $z_{i+1}$ of the Booth conversion, and outputs 0, B and 2B as a result of multiplexing. The one's complementer 116 performs a one's complement operation on the output of the multiplexer 114 that receives the two lesser bits of the generated bit string, and outputs signed binary numbers of the (n+4) bits. The conversion logic 110, which is a circuit for implementing a modified Booth conversion based on the multiplier A, outputs a signed extension bit of (n+4) bits, which is one of the values 0, ±B, and ±2B.

Figure 3:
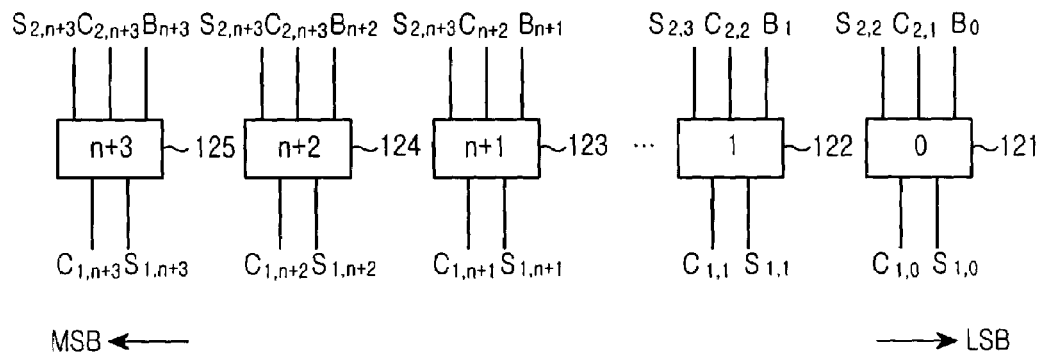
FIG. 3 is a block diagram showing a detailed configuration of the first carry save adder shown in FIG. 1.

FIG. 3 is a block diagram showing a detailed configuration of the CSA1 120 shown in FIG. 1.

Referring to FIG. 3, the CSA1 120 having (n+4) full adders 121 to 125 has as its inputs first signals $S_{2,2}$ to $S_{2,n+3}$ of (n+2) bits, second signals $C_{2,1}$ to $C_{2,n+3}$ of (n+3) bits, and third signals $B_0$ to $B_{n+3}$ being the binary numbers of (n+4) bits from the conversion logic 110, and full-adds the inputs by means of the (n+4) full adders 121 to 125 to output carry values $C_{1,0}$ to $C_{1,n+3}$ and sum values $S_{1,0}$ to $S_{1,n+3}$ of (n+4) bits. Here, an (n+2)th higher bit $S_{2,n+3}$ of the first signals is input to the three higher full adders 123 to 125, and an (n+3)th higher bit $C_{2,n+3}$ of the second signals is input to two the higher full adders 124 and 125.

Figure 4:
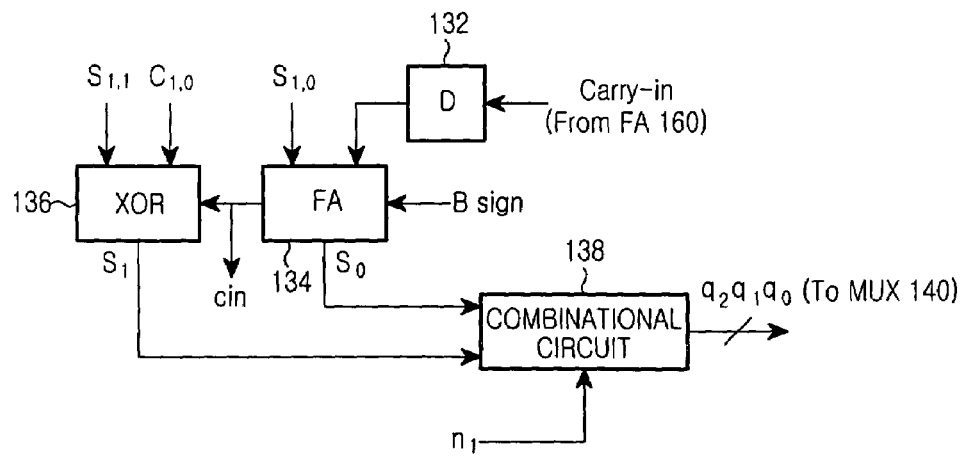
FIG. 4 is a block diagram showing a detailed configuration of the quotient logic shown in FIG. 1.

FIG. 4 is a block diagram showing a detailed configuration of the quotient logic 130 shown in FIG. 1.

Referring to FIG. 4, the quotient logic 130 has as its inputs sum values $S_{1,0}$ and $S_{1,1}$ output from the two lower full adders and a carry value $C_{1,0}$ output from lowest full adder, which are selected from the carry values and sum values of (n+4) bits from the CSA1 120, and outputs a determination value $q_2q_1q_0$ of 3 bits to determine a multiple of modular reduction. The quotient logic 130 consists of a D flip flop 132, a full adder 134, an exclusive OR (XOR) logic gate 136, and a combinational circuit 138. The D flip flop 132 temporarily stores a carry input value, Carry-in, provided from the FA 160 of FIG. 1. The full adder 134 full-adds the carry input value Carry-in stored in the D flip flop 132 and the sum value $S_{1,0}$ output from the least significant bit full adder 121 of the CSA1 120. The exclusive OR logic 136 performs an exclusive Or operation between the carry value $C_{1,0}$ output from the least significant bit full adder 121 of the CSA1 120 and the sum value $S_{1,1}$ output from a second full adder 122 of the CSA1 120. The full adder 134 generates a preset carry value cin for correction, and is provided with a sign bit B sign of the multiplicand B, though not shown in FIG. 1. In the present invention, the carry value cin for correction, output from the full adder 134 at the current clock, is input to the full adder 160 of FIG. 1 as described above, and the fuller adder 160 determines a carry input value Carry-in to be used in the quotient logic 130 at the next clock based on the carry value cin for correction. The combinational circuit 138 combines the output $S_0$ from the full adder 134, the output $S_1$ from the exclusive OR logic 136, and a preset input bit n1, and outputs the determination value $q_2q_1q_0$ of 3 bits, which is a value for determining a multiple of modular reduction.

Figure 5:
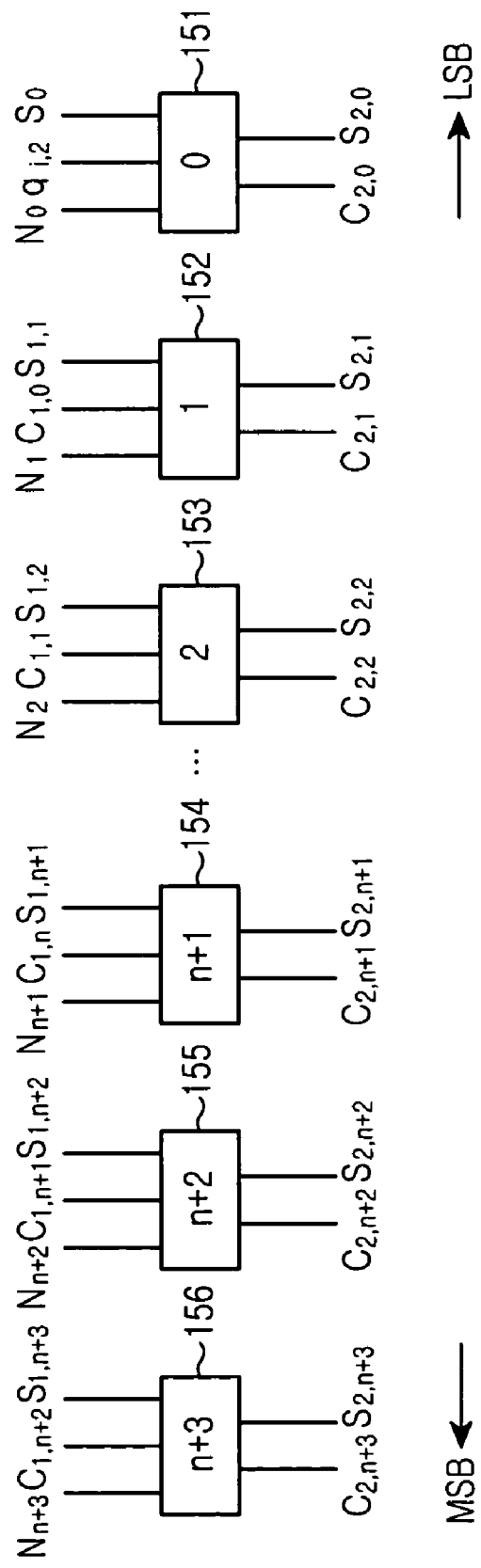
FIG. 5 is a block diagram showing a detailed configuration of the second carry save adder shown in FIG. 1.

FIG. 5 is a block diagram showing a detailed configuration of the CSA2 150 shown in FIG. 1.

Referring to FIG. 5, the CSA2 150 includes (n+4) full adders 151 to 156. The CSA2 150 include the modulus N ($N_0$–$N_{n+3}$) of (n+4) bits selected from the selector 140 as a first input signal, and remaining carry values $C_{1,0}$ to $C_{1,n+3}$ of (n+3) bits, except a most significant bit carry value of the carry values of (n+4) bits, from the CSA1 120 as a second input signal, and remaining sum values $S_{1,1}$ to $S_{1,n+3}$ of (n+3) bits, except a least significant bit-sum value of the sum values of (n+4) bits, from the CSA1 120 as a third input signal to output carry values $C_{2,0}$ to $C_{2,n+3}$ of (n+4) bits and sum values $S_{2,0}$ to $S_{2,n+3}$ of (n+4) bits by means of the (n+4) full adders 151 to 156. As for the (n+4) bits of the first input signal, the (n+4) bits of the modulus N ($N_0$~$N_{n+3}$) are input individually-carry values of the (n+3) bits of the second input signal are sequentially input, starting from a second lower full adder 152 among the full adders, and sum values $S_{1,1}$~$S_{1,n+3}$ of the (n+3) bits of the third input signal are sequentially input from the second lower full adder 152 among the full adders 152 to 156. The least significant bit full adder 151 of the full adders 151 to 156 is input with the output $S_0$ from the full adder 134 of the quotient logic 130, a second output bit $q_{i,2}$ of the combinational circuit 138, and a least significant bit $N_0$ of the modulo numbers N.

Figure 6:
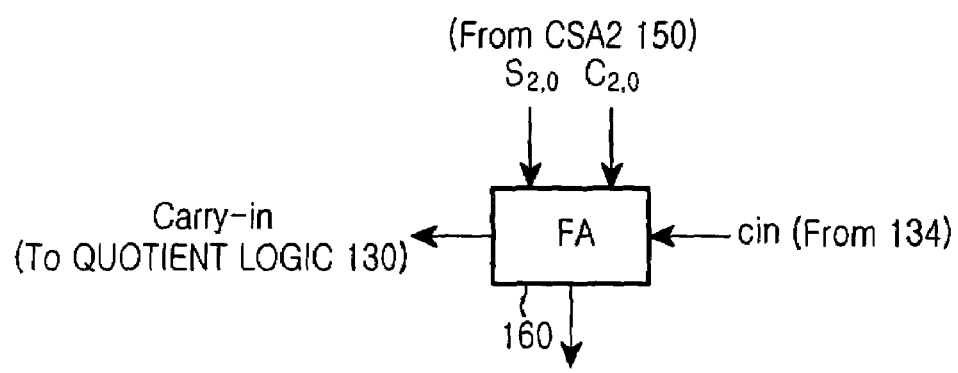
FIG. 6 is a block diagram showing a detailed configuration of the full adder shown in FIG. 1.

FIG. 6 is a block diagram showing a detailed configuration of the full adder 160 shown in FIG. 1.

Referring to FIG. 6, the full adder 160 full-adds a carry value $C_{2,0}$ output from the least significant bit full adder 151 of the CSA2 150 and a sum value $S_{2,1}$ output from the second lowest full adder 152 to output a carry input value Carry-in. The full adder 160 is also provided with a carry value cin for correction preset for full add operation and outputs the carry input value Carry-in as a result of the full add operation. The carry input value Carry-in is provided to the quotient logic 130.

B-2. Principle of the Invention

The present invention provides a device for calculating $A \cdot B \cdot R^{-1} \mod N$ in m+2 clocks with A, B and N (where $R = 4^{m+2}$, m=n/2, $-N \leq A$, and B<N), each having n bits as its inputs. Three principles that are applicable to the implementation of the present invention will be described. The three principles include a first principle of representation of the multiplier A and the multiplicand B for modular multiplication, a second principle of calculating a one's complement-based partial product using 2 bits of the multiplier A for modular multiplication, and a third principle of using the Booth conversion and the one's complement-based partial product of the present invention

B-2.a. Number Representation

In the present invention, the multiplier A and the multiplicand B are represented by signed binary numbers for the modular multiplication. A and B, each having n bits, are respectively transformed to (n+4) bits for signed operation. During this transformation, any negative values are transformed to their one's complement.

B-2.b. Booth's Conversion

The present invention employs a modified Booth conversion system, which is a modification of the Booth conversion system well known to those skilled in the art to which the invention pertains. The present invention increased the speed of the modular multiplication. The multiplier A is converted into 2 bit $z_i$ (where $0 \leq i \leq m+1$) by means of the modified Booth conversion system. Here, it is assumed that $a_{n+4} = a_{n+3}$, $a_{-1} = 0$. The following Table 1 shows a rule of the modified booth conversion according to the present invention. In addition, as shown in FIG. 2, the multiplicand 0, B or 2B is output via the multiplexer 114 according to the two bit values $z_{i+1}[1]$, $z_{i+1}[0]$. As shown in FIG. 2, to find a signed partial product −B or −2B, a one's complementary operation is selectively performed on the output of the multiplexer 114 based on the sign bit $z_{i+1}[2]$ in the Booth-converted value.

TABLE 1

| $a_{i+1}$ | $a_i$ | $a_{i-1}$ | $z_{i+1}$ |
|---|---|---|---|
| 0 | 0 | 0 | 0 [000] |
| 0 | 0 | 1 | 1 [001] |
| 0 | 1 | 0 | 1 [001] |
| 0 | 1 | 1 | 2 [010] |
| 1 | 0 | 0 | −2 [110] |
| 1 | 0 | 1 | −1 [101] |
| 1 | 1 | 0 | −1 [101] |
| 1 | 1 | 1 | 0 [000] |

In Table 1, the Booth-converted result value $z_{i+1}$ is expressed in a signed decimal number with three bits of $z_{i+1}[2]$, $z_{i+1}[1]$, $z_{i+1}[0]$, and $z_{i+1}$ can be expressed as a binary number in the brackets.

B-2.c. Radix-4 Montgomery Algorithm using Booth's Recording

The algorithm illustrated in the following Equation 1 shows that the present invention employs the modified Booth conversion system and the one's complementary operation for radix-4 Montgomery modular multiplication. An original Montgomery algorithm compares a result value Montgomery modular multiplication. An original Montgomery algorithm compares a result value with a modulus N, and performs a subtraction operation if the result value is greater than the modulus N. However, the following algorithm of the present invention does not show such a comparison and subtraction operation of the original Montgomery algorithm.

Equation 1

Input: N, $-N \leq A$, B<N

Output: $S = A \cdot B \cdot 4^{-m-2} \mod N$, $-N \leq S < N$ $$S = 0 \quad (1)$$

$$\text{for } i = 0 \text{ to } (n+1)/2 \quad (2)$$

$$S = S + A_i \times B \quad (3)$$

$$q_{i(2,1,0)} = f(s_1, s_0, n_1, n_0) \quad (4)$$

$$S = S + q_i \times N \quad (5)$$

$$S = S/2^2 \quad (6)$$

$$\text{end for} \quad (7)$$

In the algorithm of Equation 1, $A_i \times B$ in procedure (3) refers to two Booth converted bits. Procedure (4) refers to a function that causes two least significant bits of the result values in procedure (5) to be '0'. Result values in procedure (4) depend on input bits $s_1$, $s_0$, $n_1$, and $n_0$ and are determined as shown in the following Equation 2. $q_{i2}$, the most significant bit (MSB) of a value $q_i$ used for modular reduction, is a sign bit. The remaining two bits $q_{i1}q_{i0}$ are selected from among elements $\{0, \pm 1, 2\}$ $q_i$ is calculated according to the following Table 2.

Equation 2

$q_0 = s_0$

TABLE 2

| $s_0$ | $s_1$ | $n_1$ | $q_2$ | $Q_1q_0$ |
|---|---|---|---|---|
| 0 | 0 | 0 | 0 | 00 |
| 0 | 0 | 1 | 0 | 00 |
| 0 | 1 | 0 | 0 | 10 |
| 0 | 1 | 1 | 0 | 10 |
| 1 | 0 | 0 | 1 | 01 |
| 1 | 0 | 1 | 0 | 01 |
| 1 | 1 | 0 | 0 | 01 |
| 1 | 1 | 1 | 1 | 01 |

B-3. Operation of the invention

The apparatus of the present invention as shown in FIG. 1 calculates $A \cdot B \cdot R^{-1} \mod N$ in m+2 clocks with A, B and N (where $R = 4^{m+2}$, m=n/2, $-N \leq A$, and B<N), each having n bits as its inputs.

A procedure for calculating $A \cdot B \cdot R^{-1} \mod N$ (where, $R = 4^{m+2}$) by the apparatus shown in FIG. 1 will now be described. In the following description, step a) is an initialization step, steps b) to h) are steps to be performed every clock, and step i) is a step to be performed after steps b) to h) are performed during (m+2) clocks.

a) A, B, N, each having n bits, input for modular multiplication, are stored in respective registers (or memories). Although the apparatus of the present invention is shown to store the inputs A and B in respective registers 102 and 104 without showing a separate register in which N is stored, it is apparent to those skilled in the art that such a separate register is used in the apparatus of the present invention. Here, the register 102 in which A is stored is a shift register in which A is shifted to the right side by two bits for each clock. For convenience's sake, the register in which A is stored is indicated as register A and the register in which B is stored is indicated as register B. With respect to the memory, A and B are read out one word at a time. Temporary registers (or memories) C and S (both not shown in detail), in which a result of the calculation by the CSA2 150 shown in FIG. 1 is temporarily stored, are initialized as '0'.

b) When all data is input into each of the registers 102 and 104, the Booth conversion circuit 112 of the conversion logic 110 performs a Booth conversion function based on the two LSB bits in the register 102. The MUX 114 of the conversion logic 110 has as its input a value of B stored in the register 104, and finds a Booth-converted result value $z_{i+1}$ based on two LSB bits $a_{i+1}$ and $a_i$ of the register 102 and a reference bit $a_{i-1}$. A one's complementary operation is selectively performed on the output of the MUX 114 based on the sign bit $z_{i+1}[2]$ received from the one's complementer 116 in the Booth-converted result value. As a result, the one's complementer 116 provides one of the values 0 and ±B, ±2B one of three inputs to the CSA1 120 c) The CSA1 120 performs an add operation for three input signed binary numbers of n+4 bits. The CSA1 120 is composed of n+4 full adders 121 to 125. Carries generated in full adders of the CSA1 120 are provided to the full adder of the CSA2 150 at the next stage, while carries generated in the MSB full adder 125 are ignored.

d) The quotient logic 130 has as its inputs output values $S_{1,1}$, $C_{1,0}$, and $S_{1,0}$ from the CSA1 120, a Carry-in signal provided from the full adder 160, a sign bit B sign of the multiplicand B, and calculates and outputs $S_1$ and $S_0$ by means of the full adder 134 and the exclusive OR logic 136. The carry value cin for correction is input to the full adder 134. The carry value cin for correction is provided as an input to the full adder 160 The combinational circuit 138 of the quotient logic 130 has as its input $S_1$ and $S_0$ calculated in step d) and determines a value q of 3 bits by means of a truth table of Table 2. Although a detailed configuration of a circuit to determine the value of q by means of the truth table of Table 2 is not shown, it is apparent to those skilled in the art that a circuit for determining the value of q can be implemented by a general logic gate circuit.

f) The CSA2 150 has as its inputs carry values and sum values obtained as outputs of the CSA1 120 in step c), and a signed binary number of n+4 bits of one selected from 0, ±N, and ±2N determined by two LSB bits of values of q obtained in step e) to perform an n+4 bit signed operation. The CSA2 150 is composed of n+4 full adders 151 to 156. The full adders 151 to 156 of the CSA2 150 has, as its carry input of the least significant full adder 151, an MSB value $q_{1,2}$ or a sign bit of the value of q calculated in step e), and has as a sum bit a value $S_0$ which is a sum output bit of the full adder 134.

g) The full adder 160 has as its inputs $S_{2,1}$ and $C_{2,0}$ bits of output values of the CSA2 150 and bits of the carry signal cin for correction to output Carry-in bits through full adding of the inputs. This full adding operation is for correcting a difference between the existing Booth conversion system using two's complement and the modified Booth c onversion system of the present invention using one's complement.

h) (n+2) sum values and (n+3) carry values from the MSBs of the outputs of the CSA2 150 are fedback to the CSA1 120 as its input. At this time, $S_{2,n+3}$ being the MSB of a sum value which is an output from the MSB full adder 156 of the CSA2 150 is copied and two bits are added thereto, and $C_{2,n+3}$ being the MSB of a carry value which is an output from the MSB full adder 156 of the CSA2 150, are copied and one bit is added thereto. Results of such a copy and an addition for $S_{2,n+3}$ and $C_{2,n+3}$ are input to the CSA1 120. The sum value $S_{2,n+3}$ output from the full adder 156 of the CSA2 150 is provided to three full adders 123 to 125 of the CSA1 120, and the carry value $C_2n+_3$ is provided to two full adders 124 and 125 of the CSA1 120.

i) The following operation is performed after steps b) to h) are performed during (m+2) clocks. A carry propagation adder (CPA) (not shown) performs an addition operation for the carry value and the sum value, which are outputs of the CSA2 150. If a result value of the addition is a negative number, a modulus N is added thereto, but if the result value of the addition is a positive number, the modulus N is not added thereto.

For example, if each of A, B and N has 12 bits as shown in the following Equation 3, a Montgomery modular operation result according to the above-described procedure is as shown in the following Table 3 and Table 4.

Equation 3

$$N = 0000.1010.0101.1001 (0xA59)$$
$$B = 0000.0101.1100.0011 (0x5C3)$$

$$N' = 1111.0101.1010.0110 \quad B' = 1111.1010.0011.1100$$

$$2N = 0001.0100.1011.0010 \quad 2B' = 1111.0100.0111.1001$$

$$A = 0000.1001.0011.1110 (0x93E)$$

TABLE 3

| I | $A_i$ | CSA1 out S C | B-sign | Carry-in | $S_1S_0$ | C |
|---|---|---|---|---|---|---|
| I | 0 | 0000.0000.0000.0000 0.0000.0000.0000.000 | 0 | 0 | 00 | 0 |
| 0 | −2 | 1111.0100.0111.1001 0.0000.0000.0000.000 | 1 | 0 | 10 | 1 |
| 1 | 0 | 1111.0010.0010.1010 0.0001.0000.0010.100 | 0 | 1 | 11 | 0 |
| 2 | 0 | 1111.0011.0000.0000 0.0001.0000.0010.100 | 0 | 1 | 01 | 0 |
| 3 | 1 | 1111.1000.1111.0000 0.0000.1011.0000.011 | 0 | 1 | 11 | 0 |
| 4 | 1 | 1111.1110.1000.0000 0.0000.1010.1101.011 | 0 | 1 | 11 | 0 |
| 5 | −2 | 0000.1110.1001.0010 1.1110.1010.1101.001 | 1 | 1 | 10 | 1 |
| 6 | 1 | 1111.1110.1011.0110 0.0000.1010.1001.001 | 0 | 1 | 01 | 0 |
| 7 | 0 | 1111.1111.0011.1011 0.0000.0000.0000.000 | 0 | 1 | 00 | 1 |

TABLE 4

| I | $A_i$ | $S_1S_0$ | C | $q_2q_1$ | CSA2 out S C | Carry-in |
|---|---|---|---|---|---|---|
| I | 0 | 00 | 0 | 000 | 0000.0000.0000.0000 0.0000.0000.0000.000 | 0 |
| 0 | −2 | 10 | 1 | 010 | (11).1110.0000.1100.1010 (0)0.0010.1000.0110.000 | 1 |
| 1 | 0 | 11 | 0 | 001 | (11).1110.1000.0101.0010 (0)0.0010.0100.0101.001 | 1 |
| 2 | 0 | 01 | 0 | 101 | (00).0001.0110.1000.1110 (1)1.1110.0010.0100.001 | 1 |
| 3 | 1 | 11 | 0 | 001 | (11).1111.1001.1010.1110 (0)0.0001.0100.1010.001 | 1 |
| 4 | 1 | 11 | 0 | 001 | (11).1111.1110.0000.1110 (0)0.0001.0101.1010.001 | 1 |

TABLE 4-continued

| I | $A_i$ | $S_1S_0$ | C | $q_2q_1$ | CSA2 out S C | Carry-in |
|---|---|---|---|---|---|---|
| 5 | −2 | 10 | 1 | 010 | (11).1111.0000.1111.0010 (0)0.0001.1101.0010.010 | 1 |
| 6 | 1 | 01 | 0 | 101 | (00).0000.0001.1000.0010 (1)1.1111.1101.0110.111 | 1 |
| 7 | 0 | 00 | 1 | 000 | 1111.1111.1011.1010 0.0000.0000.0000.000 | 1 |

A procedure for calculating the modular multiplication A·B mod N using the result values of the operation by the apparatus of the present invention as described above will now be described. It should be noted that a hardware configuration for performing the procedure is apparent to those skilled in the art, and hence, detailed explanation thereof is omitted. The following calculations are performed:

should be noted that a hardware configuration for performing the procedure is apparent to those skilled in the art, and hence, detailed explanation thereof is omitted. The following calculations are performed:

1) Calculate $P=2^{2(n+4)} \mod N$;
2) Calculate $C=A \cdot B \cdot 2^{-(n+4)} \mod N$; and
3) Calculate $P \cdot C \cdot 2^{-(n+4)} \mod N = A \cdot B \mod N$.

A procedure for calculating the modular exponentiation, $m^e \mod N$, required to perform the RSA operation using the result values of the operation of the apparatus of the present invention as described above will now be described. The following operations are performed:

1) Store an exponent e in a register (or a memory);
2) Store a modulus N in the temporary register
3) Initialize the temporary registers C and S to '0';
4) Perform Montgomery modular multiplication, $m'=f_m (m,P,N)=m \cdot P \cdot R^{-1} \mod N$, where P in the modular exponentiation is a pre-calculated value defined in step 1) for the modular multiplication operation the aforementioned procedure, and $R=2^{n+4}$;
5) Load m' into the register B;
6) Perform modular square operation using a value loaded into the register B, here, where the multiplier A required for the Montgomery modular multiplication is loaded from the register B and its value is obtained by using the modified Booth-conversion circuit;
7) Shift the exponent e to the left;
8) Ignore MSB 1 of the exponent e and perform subsequent steps 9) and 10) after the next bits;
9) Perform steps 4) and 5) for the modular square operation regardless of a bit (0 or 1) of multiplication after performing step 9), where, the multiplicand is the content of the register B and the multiplier is the base m' in the exponentiation; and
11) Perform the modular multiplication once more using step 4) after performing steps 8) to 10) for all bits of the exponent e, where, the multiplicand is the content of the register B and the multiplier is 1.

If a result value of the performance of the CPA for values remaining in the registers C and S after performing the above steps 1) to 11) is a negative number, the modulus N is added thereto. Otherwise, if the result value is a positive number, it becomes a final value of the exponentiation, $m^e \mod N$, with no addition of the modulus N.

B-4. Effect of the Invention

As apparent from the above description, the present invention provides a circuit for calculating $A \cdot B \cdot 2^{-(n+4)} \mod N$, making the general modular multiplication A·B mod N possible by means of the circuit. A·B mod N calculated according to the present invention is applicable to hardware apparatuses employable for devices in generating and verifying digital signatures. In addition, the present invention is applicable to hardware apparatuses for generating electronic signatures, authentication, and encryption/decryption based on IC card. In addition, the present invention can provide devices for encrypting and decrypting data or information by means of the electronic signature apparatus for performing the modular multiplication. Furthermore, the present invention can be used to implement existing public key cryptography systems such as NIST-DSS, RSA, ElGamal, and Schnorr electronic signatures, based on the electronic signature apparatus.

C. Second Embodiment

C-1. Configuration of the Invention

Figure 7:
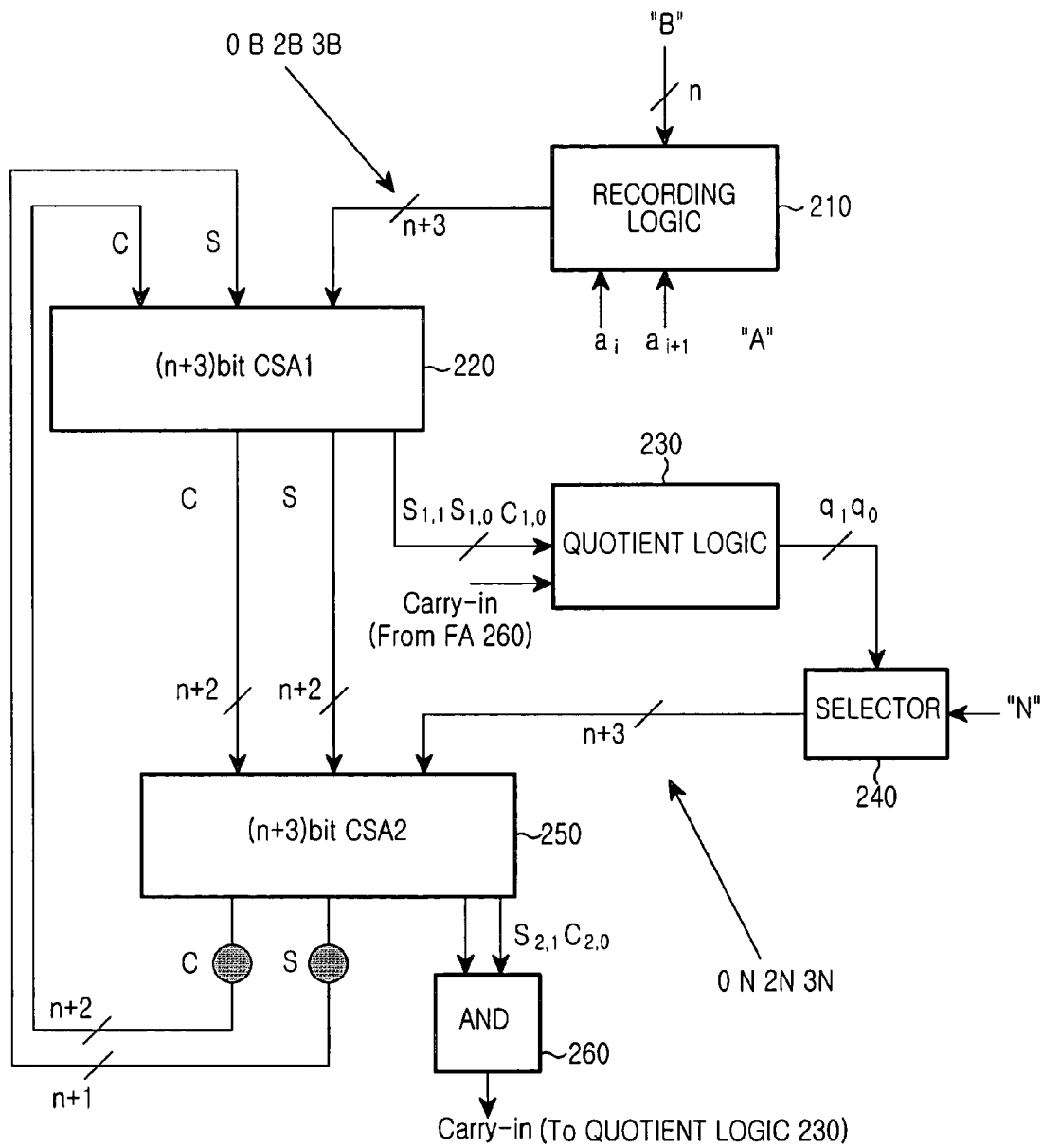
FIG. 7 is a block diagram showing a configuration of a modular multiplication apparatus in accordance with a second embodiment of the present invention.

FIG. 7 is a block diagram showing a configuration of a modular multiplication apparatus in accordance with the second embodiment of the present invention.

Referring to FIG. 7, the modular multiplication apparatus includes conversion logic 210, a first carry save adder (hereinafter, abbreviated as "CSA1") 220, quotient logic 230, a selector 240, a second carry same adder (CSA2) 250, and an AND logic gate 260. The modular multiplication apparatus is a hardware device for calculating $A \cdot B \cdot R^{-1} \mod N$ in m+2) clocks with A, B and N (where $R=4^{m+2}$, m=n/2, $-N \leq A$, and B<N), each having n bits as its inputs, according to a modified Montgomery algorithm. Namely, the modular multiplication apparatus has a configuration for calculating $A \cdot B \cdot 2^{-(n+4)} \mod N$ Each of the CSAs 220 and 250 is composed of (n+4) full adders in parallel, each of which has a 3 bit input, and outputs a carry bit and a sum bit. The conversion logic 210 performs modified Booth conversion operation based on the multiplier A, and selects and outputs one of the values of 0, B, 2B, and 3B of (n+3) bits. The quotient logic 230 has as its inputs a least significant bit (LSB) carry value $C_{1,0}$ and two sum LSB bits $S_{1,1}$ and $S_{1,0}$ from the CSA1 220, a carry-in, and a sign bit of B, and outputs $q_1q_0$ of 2 bits, which is a value for determining a multiple of the modular reduction. The selector 240, which can be implemented by multiplexers (MUXs), selects and outputs one of 0, N, 2N, and 3N based on a determined value of q. The AND logic 260 performs an AND operation, with two bits $S_{2,1}$ and $C_{2,0}$ output from the CSA2 250 as its inputs, and provides a result value of the operation to the quotient logic 230 as a carry-in signal.

Although not shown in detail in FIG. 7, it should be noted that the modular multiplication apparatus includes temporary storing registers C and R for storing carry values and sum values, which are the outputs form the CSA2 250, for each clock, and a carry propagation adder for adding values stored in the temporary storing registers C and R and outputting a resultant value as a result of the modular multiplication.

Figure 8:
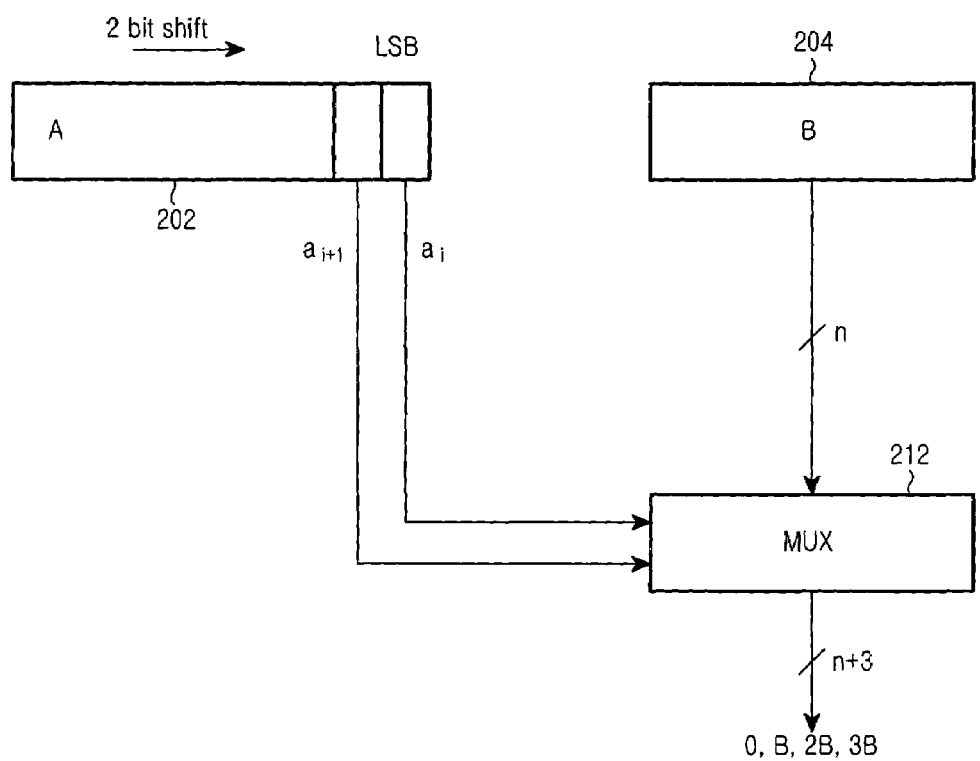
FIG. 8 is a block diagram showing a detailed configuration of a conversion circuit shown in FIG. 7.

FIG. 8 is a block diagram showing a detailed configuration of the conversion logic 210 shown in FIG. 7.

Referring to FIG. 8, the conversion logic 210 Booth converts the two lesser bits of a bit string generated by sequentially shifting bits of the multiplier A, multiplexes a result of the Booth conversion with the multiplicand B, and outputs binary numbers of (n+3) bits. For this purpose, a shift register 202 for sequentially shifting bits of the multiplier to generate a shifted bit string and a register 204 for storing the multiplicand are provided at the front stage of the conversion logic 210. The conversion logic 210 also includes a multiplexer (MUX) 212. The multiplexer 212 multiplexes the two lesser bits $a_{i+1}$ and $a_i$ of the generated bit string with the multiplicand, and outputs 0, B, 2B and 3B as a result of multiplexing. The conversion logic 210, which is a circuit implementing a modified Booth conversion based on the multiplier A, selects and outputs one of the values of 0, B, 2B and 3B of (n+3) bits.

Figure 9:
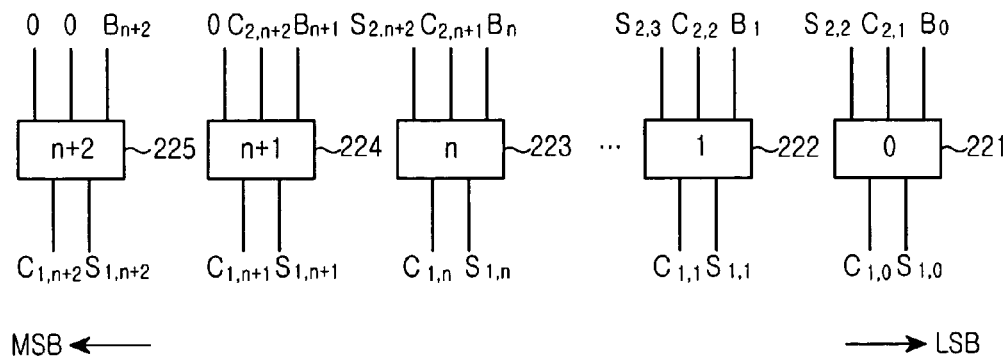
FIG. 9 is a block diagram showing a detailed configuration of the first carry save adder shown in FIG. 7.

FIG. 9 is a block diagram showing a detailed configuration of the CSA1 shown in FIG. 7.

Referring to FIG. 9, the CSA1 220 having (n+4) full adders 221 to 225 has as its inputs first signals $S_{2,2}$ to $S_{2,n+2}$ of (n+1) bits, second signals $C_{2,1}$ to $C_{2,n+2}$ of (n+2) bits, and third signals $B_0$ to $B_{n+2}$ being the binary numbers of (n+3) bits from the conversion logic 210, and full-adds the inputs by means of (n+3) full adders 221 to 225 to output carry values $C_{1,0}$ to $C_{1,n+2}$ and sum values $S_{1,0}$ to $S_{1,n+2}$ of (n+3) bits. The first and second signals are signals provided from the CSA2 250 and the third signals are signals provided from the conversion logic 210. A most significant bit $S_{2,n+2}$ of the first signals is input to the third-highest full adder 223 of the full adders, and a most significant bit $C_{2,n+2}$ of the second signals is input to the second-highest full adder 224 of the full adders. A most significant bit full adder 225 of the full adders is provided with "0" as the first and second signals and the second-highest full adder 224 is provided with "0" as the first signals. Namely, the first signals $S_{2,2}$ to $S_{2,n+2}$ of (n+1) bits are sequentially input to a least significant bit full adder 221 and to a (n+1)th full adder 223 of the CSA1 220, respectively, and "0" is input as the first signal to a (n+2)th full adder 224 and a (n+3)th full adder 225. In addition, the second signals $C_{2,1}$ to $C_{2,n+2}$ of (n+2) bits are sequentially input to the least significant bit full adder 221 and to the (n+2)th full adder 224 of the CSA1 220, respectively, and "0" is input as the second signal to a (n+3)th full adder 225. In addition, the third signals $B_0$ to $B_{n+2}$ of (n+3) bits are sequentially input to the least significant bit full adder 221 and to the (n+1)th full adder 223 of the CSA1 220, respectively.

Figure 10:
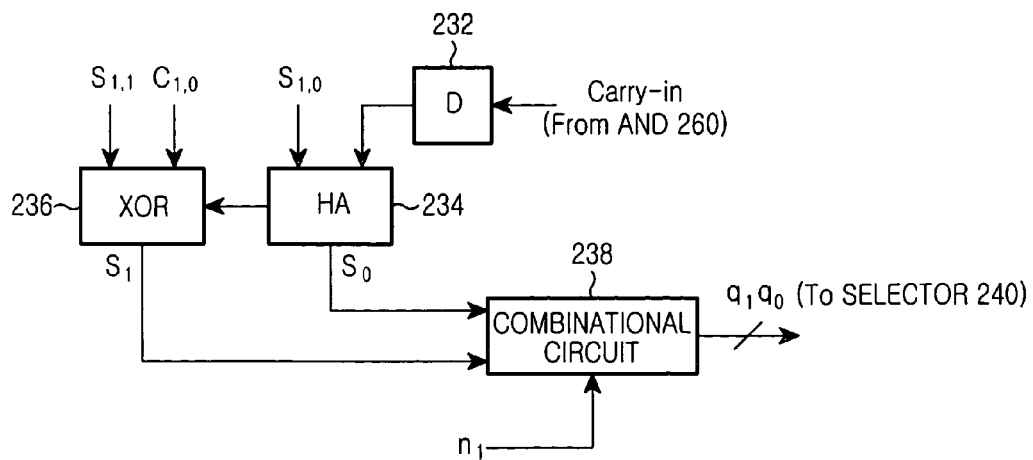
FIG. 10 is a block diagram showing a detailed configuration of the quotient logic shown in FIG. 7.

FIG. 10 is a block diagram showing a detailed configuration of the quotient logic 230 shown in FIG. 7.

Referring to FIG. 10, the quotient logic 230 has as its inputs sum values $S_{1,0}$ and $S_{1,1}$ output from two lesser full adders and a carry value $C_{1,0}$ output from a lesser full adder, which are selected from the carry values and sum values of (n+4) bits from the CSA1 120, and outputs a determination value $q_1q_0$ of 2 bits to determine a multiple of the modular reduction. The quotient logic 230 consists of D flip flop 232, a half adder (HA) 234, an exclusive OR (XOR) logic gate 236, and a combinational circuit 238. The D flip flop 232 temporarily stores a carry input value Carry-in input thereto from the AND logic 260. The half adder 234 half-adds the carry input value Carry-in stored in the D flip flop 232 and the sum value $S_{1,0}$ output from the least significant bit full adder 221 of the CSA1 220. The exclusive OR logic 236 performs an exclusive Or operation the carry value $C_{1,0}$ output from the least significant bit full adder 221 of the CSA1 220 and the sum value $S_{1,1}$ output from a second-lowest full adder 222. The combinational circuit 238 combines an output $S_0$ from the half adder 234, an output $S_1$ from the exclusive OR logic 236, and a preset input bit n1 to output the determination value $q_1q_0$ of 2 bits.

Figure 11:
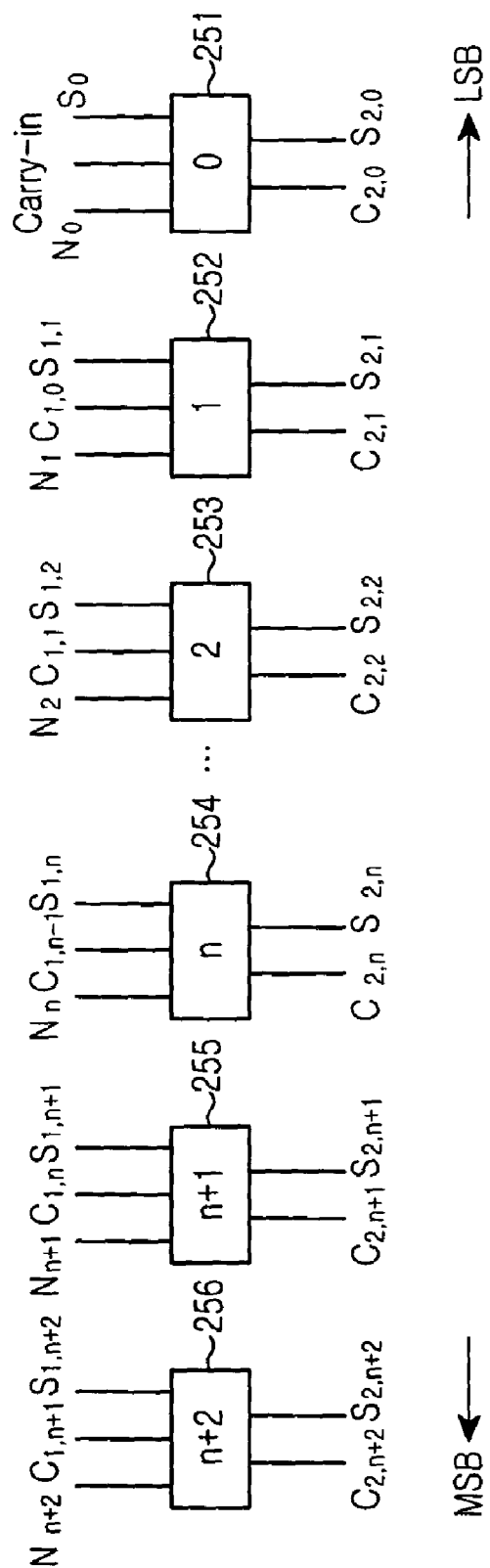
FIG. 11 is a block diagram showing a detailed configuration of the second carry save adder shown in FIG. 7.

FIG. 11 is a block diagram showing a detailed configuration of the CSA2 shown in FIG. 7.

Referring to FIG. 11, the CSA2 250 has (n+3) full adders 251 to 256. The CSA2 250 has modulus N ($N_0$–$N_{n+2}$) of (n+3) bits selected from the selector 240 as first input signals, and remaining carry values $C_{1,0}$ to $C_{1,n+2}$ of (n+2) bits, except a most significant bit carry value of the carry values of (n+3) bits, from the CSA1 220 as second input signals, and remaining sum values $S_{1,1}$ to $S_{1,n+2}$ of (n+2) bits except a least significant bit carry value of the sum values of (n+3) bits from the CSA1 220 as third input signals to output carry values $C_{2,0}$ to $C_{2,n+2}$ of (n+3) bits and sum values $S_{2,0}$ to $S_{2,n+2}$ of (n+3) bits by means of the (n+3) full adders 251 to 256. The (n+3) bits of the first input signals are sequentially input, starting from a least significant bit full adder 251, to respective full adders 251 to 256, the (n+2) bits of the second input signals are sequentially input, starting from a second-lowest full adder 252, to respective full adders 252 to 256, and the (n+2) bits of the third input signals are sequentially input, starting from the second-lowest full adder 252, to respective full adders 252 to 256. The least significant bit full adder 251 of the full adders 251 to 256 is input with the output $S_0$ from the half adder 234 of the quotient logic 230 and the carry input value Carry-in from the AND logic 260.

Figure 12:
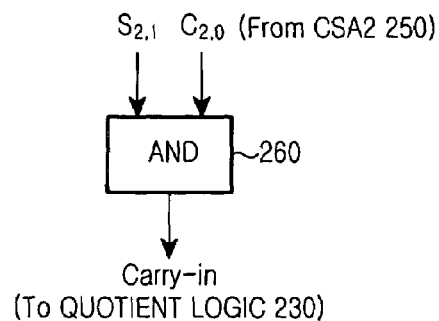
FIG. 12 is a diagram showing a detailed configuration of the full adder shown in FIG. 7.

FIG. 12 is a block diagram showing a detailed configuration of the AND logic shown in FIG. 7.

Referring to FIG. 12, the AND logic 260 full-adds a carry value $C_{2,0}$ output from the least significant bit full adder 251 of the CSA2 250 and a sum value $S_{2,1}$ output from the second-lowest full adder 252 to output the carry input value Carry-in. The carry input value Carry-in is provided to the quotient logic 230.

C-2. Principle of the Invention

The present invention provides a device for calculating $A \cdot B \cdot R^{-1}$ mod N in m+2 clocks with A, B and N (where $R=4^{m+2}$, m=n/2, $-N \leq A$, and B<N), each having n bits as its inputs. Two principles that are applicable to implementation of the present invention will now be described. The two principles include a first principle of representation of the multiplier A and the multiplicand B for modular multiplication and a second principle of the Montgomery algorithm using a principle of conversion of the present invention.

C-2.a 2 bit Scanning

In the present invention, the multiplier A is scanned (or shifted) by two bits from the LSB for each clock and is then multiplied with the multiplicand B, and a result of the multiplication is used for the Montgomery algorithm. Therefore, $a_i$ generated in each loop, which is one of elements {0, 1, 2, 3}, is multiplied with the multiplicand B, and a result of the multiplication is input to the CSA1 220.

C-2.b. Radix-4 Montgomery Algorithm

The following algorithm illustrated in Equation 4 shows that the present invention employs radix-4 Montgomery modular multiplication. An original Montgomery algorithm compares a result value with a modulus N, and performs a subtraction operation if the result value is greater than the modulus N. However, the following algorithm of the present invention does not show such a comparison and subtraction operation of the original Montgomery algorithm. modulus N. However, the following algorithm of the present invention does not show such a comparison and subtraction operation of the original Montgomery algorithm.

Equation 4

Input: N, $-N \leq A$, B<N

Output: $S = A \cdot B \cdot 4^{-m-2}$ mod N, $0 \leq S < N$

S=0            (1)

for $i=0$ to $(n+1)/2$ (2)

$S = S + A_i \times B$ (3)

$q_{i(0,0)} = f(s_1, s_0, n_1, n_0)$ (4)

$S = S + q_i \times N$ (5)

$S = S/2^2$ (6)

end for (7)

In the algorithm of Equation 4, $A_i$ in procedure (3) relates to two scanned bits. Procedure (4) relates to a function to cause the two least significant bits of the result values in procedure (5) to be '0'. The result values in procedure (4) depend on input bits $s_1$, $s_0$, $n_1$, and $n_0$, and, for the Montgomery modular multiplication, is actually determined as shown in the following Table 5 since N is an odd number and $n_0$ is always 1. A value $q_i$ used for modular reduction is one of the elements of {0, 1, 2, 3} and is calculated according to the following Equation 5.

Equation 5

TABLE 5

| $s_0$ | $s_1$ | $n_1$ | $q_1$ | $q_0$ |
|---|---|---|---|---|
| 0 | 0 | 0 | 0 | 0 |
| 0 | 0 | 1 | 0 | 0 |
| 0 | 1 | 0 | 0 | 0 |
| 0 | 1 | 1 | 0 | 0 |
| 1 | 0 | 0 | 1 | 1 |
| 1 | 0 | 1 | 0 | 1 |
| 1 | 1 | 0 | 0 | 1 |
| 1 | 1 | 1 | 1 | 1 |

C-3. Operation of the Invention

The apparatus of the present invention as shown in FIG. 7 calculates $A \cdot B \cdot R^{-1}$ mod N in m+2 clocks with A, B and N (where $R = 4^{m+2}$, m=n/2, $-N \leq A$, and B<N), each having n bits, as its inputs.

A procedure for calculating $A \cdot B \cdot R^{-1}$ mod N (where $R = 4^{m+2}$) by the apparatus shown in FIG. 7 will now be described. In the following description, step a) is an initialization step, steps b) to h) are steps to be performed every clock, and step i) is a step to be performed after the steps b) to h) are performed during (m+2) clocks.

a) A, B, and N, each consisting of n bits, input for modular multiplication, are stored in respective registers (or memories). In addition, 2B and 3B of n+2 bits are stored in respective registers (or memories). Although the apparatus of the present invention is shown to store the inputs A and B in respective registers 202 and 204 without showing separate registers in which 2B and 3B are respectively stored, it is apparent to those skilled in the art that such separate registers are used in the apparatus of the present invention. The register 202 in which A is stored, is a shift register in which A is shifted to the right side by two bits for each clock. The register in which A is stored is indicated as register A and the register in which B is stored is indicated as register B. In the case of the memory, A and B are read one word at a time. Temporary registers (or memories) C and S (both not shown in detail), in which a result of calculation by the CSA2 250 shown in FIG. 7, is temporarily stored are initialized as '0'.

b) When all data is input to each of the registers 202 and 204, the conversion logic 210 performs a Booth conversion function based on the two LSB bits in the register A 202. The MUX 212 of the conversion logic 210 has as its input a value stored in the register B 204 and selects one of the values of 0, B, 2B, 3B, which is provided as one of three inputs of the CSA1 220, based on the two LSB bits in the register A 202.

c) The CSA1 220 performs an add operation for three input binary numbers of n+3 bits. The CSA1 220 is composed of n+3 full adders 121 to 125.

d) The quotient logic 230 has as its inputs output values $S_{1,1}$, $C_{1,0}$, and $S_{1,0}$ of the CSA1 220 and a Carry-in signal provided from the AND logic 260, and calculates and outputs $S_1$ and $S_0$ by means of the half adder 234 and the exclusive OR logic 236.

e) The combinational circuit 238 of the quotient logic 230 has as its inputs $S_1$ and $S_0$ calculated in step d) and determines a value q of 2 bits by means of a truth table of Table 5. Although a detailed configuration of a circuit to determine the value of q by means of the truth table of Table 5 is not shown, it is apparent to those skilled in the art that a circuit for determining the value of q can be implemented by a general logic gate circuit.

f) The CSA2 250 has as its inputs carry values and sum values obtained as outputs of the CSA1 220 in step c), and a binary number of n+3 bits of one selected from 0, N, 2N and 3N determined by the two LSB bits of values of q obtained in step e) to perform an n+3 bit non-signed operation. The CSA2 250 is composed of n+3 full adders 251 to 256 like the CSA1 220. It should be noted that the LSB full adder 251 of the full adders 251 to 256 has as its carry input the Carry-in signal generated in a previous stage.

g) The AND logic 260 has as its inputs $S_{2,1}$ and $C_{2,0}$ bits of output values of the CSA2 250 to output Carry-in bits through an AND operation on the inputs.

h) (n+2) sum values and (n+3) carry values from MSBs of the outputs of the CSA2 250 are fedback to the CSA2 220 as its input. Two higher bits of the sum values and one higher bit of the carry values are "0" and two bits are shifted to the right side in the CSA2 250 for the feedback to the CSA1 220. The sum value $S_{2,n+2}$ output from the full adder 256 of the CSA2 250 is provided to the third-highest full adder 223 of the CSA1 220, and the sum value of "0" is provided to the MSB full adder 225 and the second-highest full adder 224. The carry value $C_{2,n+2}$ output from the full adder 256 of the CSA2 250 is provided to the second-highest full adders 224 of the CSA1 220 and the carry value of "0" is provided to the MSB full adder 225.

i) The following operation is performed after steps b) to h) are performed during (m+2) clocks. A carry propagation adder (CPA) (not shown) performs addition an operation for the carry value and the sum value, which are outputs of the CSA2 250.

For example, if each of A, B and N has 12 bits as shown in the following Equation 6, a Montgomery modular operation result according to the above-described procedure is as shown in the following Table 6 and Table 7. At this time, a final result of operation is as follows:

FinalResult: 0111.1100.0111(0x7C7)+0010.1000.0000 (0x280)+1=1010.0100.1000(0xA48)

Equation 6

$N = 000.1010.0101.1001(0xA59)$
$B = 000.0101.1100.0011(0x5C3)$ $2N = 001.0100.1011.0010(0x13B2)$
$2B = 000.1011.1000.0110(0xB86)$ $3N = 001.1111.0000.1011(0x1F0B)$
$3B = 001.0001.0100.1001(0x1149)$ $A=000.1001.0011.1110 (0x93E)$

TABLE 6

| I | $A_i$ | CSA1 out' S C | Carry-in | $S_1S_0$ |
|---|---|---|---|---|
| I | 0 | 000.0000.0000.0000 0000.0000.0000.000 | 0 | 00 |
| 0 | 2 | 000.1011.1000.0110 0000.0000.0000.000 | 0 | 10 |
| 1 | 3 | 001.0110.1100.0101 0000.0010.1001.001 | 0 | 11 |
| 2 | 3 | 001.0111.1010.0010 0000.0010.1001.001 | 1 | 01 |
| 3 | 0 | 000.1001.0100.1111 0000.0101.0000.000 | 1 | 00 |
| 4 | 1 | 000.0110.0101.0000 0000.0011.0000.011 | 1 | 11 |
| 5 | 2 | 000.1001.0110.1101 0000.0111.0000.010 | 1 | 10 |
| 6 | 0 | 000.0100.0010.0100 0000.0101.0010.010 | 1 | 01 |
| 7 | 0 | 000.0101.0001.0000 0000.0101.0000.010 | 1 | 01 |

TABLE 7

| I | $A_i$ | $S_1S_0$ | $q_1q_0$ | CSA2 out S C | Carry-in |
|---|---|---|---|---|---|
| I | 0 | 00 | 00 | 000.0000.0000.0000 0000.0000.0000.000 | 0 |
| 0 | 2 | 10 | 10 | (0.0).001.1111.0011.0100 (0).0000.0001.0000.010 | 0 |
| 1 | 3 | 11 | 01 | (0.0)001.1110.0000.1110 (0).0000.0101.1010.001 | 1 |
| 2 | 3 | 01 | 11 | (0.0).000.1010.0011.1010 (0).0010.1111.0000.011 | 1 |
| 3 | 0 | 00 | 00 | (0.0)000.1100.0100.1110 (0).0000.0010.0000.001 | 1 |
| 4 | 1 | 11 | 01 | (0.0)000.1111.0000.1110 (0).0000.0100.1010.001 | 1 |
| 5 | 2 | 10 | 10 | (0.0)001.1010.1101.1010 (0).0000.1010.0100.101 | 1 |
| 6 | 0 | 01 | 11 | (0.0)001.1110.0000.1010 (0).0000.1010.0100.101 | 1 |
| 7 | 0 | 01 | 11 | (0.0)001.1111.0001.1110 (0).0000.1010.0000.001 | 1 |

A procedure for calculating the modular multiplication A·B mod N using result values of the operation by the apparatus of the present invention as described above will be described as follows. It should be noted that a hardware configuration for performing the procedure is apparent to those skilled in the art, and hence, a detailed explanation thereof is omitted. The following calculations are performed 1) Calculate $P=2^{2(n+4)}$ mod N;
2) Calculate $C=A \cdot B \cdot 2^{-(n+4)}$ mod N; and
3) Calculate $P \cdot C \cdot 2^{-(n+4)}$ mod $N=A \cdot B$ mod N.

Next, a procedure for calculating the modular exponentiation, $m^e$ mod N, required to perform the RSA operation using the result values of the operation of the apparatus of the present invention as described above will be described as follows. The following procedure occurs:

1) Store an exponent e in a register (or a memory);
2) Store a modulus N in the temporary register C;
3) Initialize the temporary registers C and S to '0';
4) Perform Montgomery modular multiplication, $m'=f_m(m,P,N)=m \cdot P \cdot R^{-1}$ mod N, where, a P in the modular exponentiation is a pre-calculated value defined in the aforementioned procedure, and R=2n+4;
5) Load m' into the register B;
6) Perform modular square operation using a value loaded into the register B, where, the multiplier A required for the Montgomery modular multiplication is loaded from the register B and its value is obtained by using the radix-4 conversion circuit;
7) Shift the exponent e to the left;
8) Ignore MSB 1 of the exponent e and perform subsequent steps 9) and 10) after next bits;
9) Perform steps 4) and 5) for the modular square operation regardless of a bit (0 or 1) of the exponent e, the multiplier and the multiplicand, which are required for the square operation, are stored in the register A and the register B, respectively;
10) If the current bit of the exponent e is 1, perform steps 4) and 5) for the modular multiplication after performing step 9), at this time, the multiplicand is the content of the register B and the multiplier is the base m' in the exponentiation; and
11) Perform the modular multiplication once more using step 4) after performing steps 8) to 10) for all bits of the exponent e, where the multiplicand is the content of the register B and the multiplier is 1.

The result value of the performance of the CPA for values remaining in the registers C and S after performing the above steps 1) to 11) becomes a final value of the exponentiation, $m^e$ mod N.

C-4. Effect of the Invention

As apparent from the above description, the present invention provides a circuit for calculating $A \cdot B \cdot 2^{-(n+4)}$ mod N, making the general modular multiplication A·B mod N possible by means of the circuit. A·B mod N calculated according to the present invention is applicable in hardware apparatuses employable in devices for generating and verifying digital signatures. In addition, the present invention is applicable to hardware apparatuses for defining electronic signatures, authentication and encryption/decryption based on IC cards. In addition, the present invention can provide devices for encrypting and decrypting data or information by means of an electronic signature apparatus for performing the modular multiplication. Furthermore, the present invention can be used to implement existing public key cryptography systems such as NIST-DSS, RSA, ElGamal, and Schnorr electronic signatures, based on the electronic signature apparatus.

D. Example of Application of the Invention

Figure 13:
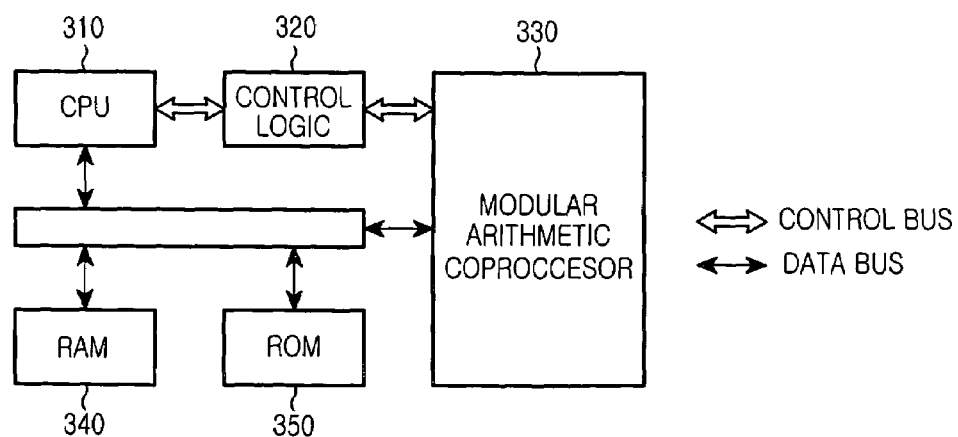
FIG. 13 is a block diagram showing an example of application of the modular multiplication apparatuses in accordance with the embodiments of the present invention.

FIG. 13 is a block diagram of an IC card, which is capable of performing encryption and electronic signature by using the Montgomery type modular multiplication apparatus disclosed in the present application.

In FIG. 13, a central processing unit (CPU) 310 decodes instructions to perform an encryption, authentication and electronic signature, and provides control signals and data required for a modular calculation to coprocessor 330. A read only memory (ROM) 350 contains a security module for securing data, for example, a key required for encryption and electronic signature. Control logic 320 and random access memory (RAM) 340 are also shown, and provide their logic and memory to perform the above operations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal processing apparatus for performing modular multiplication for use in a signal processing system, the apparatus comprising:
   a first logic for outputting a signed multiplicand by selectively performing a one's complementary operation on a multiplicand according to a Booth conversion result of a multiplier in modular multiplication;
   a second logic for outputting a modulus which is signed in the modular multiplication based on a carry input value Carry-in of a current clock, determined from a carry value cin for correction of a previous clock, and on a sign bit of the multiplicand; and
   a third logic for determining the carry input value Carry-in of the current clock from the carry value cin for correction of the previous clock and receiving the signed multiplicand and the signed modulus, and calculating a result value of the modular multiplication by iteratively performing a full addition operation on a carry value C and a sum value S of the full addition operation, found at the previous clock.

2. The apparatus of claim 1, wherein the first logic receives two least significant bits of the multiplier and a predetermined reference bit while sequentially shifting bits of the multiplier, and performs the Booth conversion thereon.

3. The apparatus of claim 2, wherein the first logic comprises:
   a Booth conversion circuit for performing the Booth conversion using the two least significant bits of the multiplier and the reference bit;
   a multiplexer for multiplexing the multiplicand based on the two least significant bits of the multiplier; and
   a one's complementer for outputting the signed multiplicand by selectively performing the one's complementary operation on the output of the multiplexer based on a sign bit of the Booth conversion result.

4. The apparatus of claim 1, wherein the third logic performs the full addition operation using at least two Carry Save Adders (CSAs) each including a plurality of full adders.

5. The apparatus of claim 1, wherein the second logic comprises:
   a quotient logic for determining at every clock first bit values which are extracted by as many values as a predetermined number of bits, beginning from a least significant bit for each of the carry value and the sum value calculated in the third logic, and second bit values for determining a multiple of modular reduction in the modular multiplication based on the carry input value Carry-in and a sign bit of the multiplicand; and
   a selector for selecting the signed modulus based on the second bit values.

6. The apparatus of claim 1, wherein the third logic further comprises a full adder for outputting the carry input value Carry-in by performing the full addition operation using the carry value cin for correction and the sign bit of the multiplicand, received from the second logic.

7. The apparatus of claim 1, wherein the third logic performs a carry propagation addition operation on the carry value and the sum value output from the third logic after (m+2) clocks, where m=n/2, when each of the multiplier, the multiplicand and the modulus has n bits.

8. The apparatus of claim 7, wherein the third logic adds the modulus to the carry propagation addition operation result when a result of the carry propagation addition operation is a negative number.

9. A signal processing method for performing modular multiplication for use in a signal processing system, the method comprising:
   outputting a signed multiplicand by selectively performing a one's complementary operation on a multiplicand according to a Booth conversion result of a multiplier in modular multiplication;
   finding a carry input value Carry-in of a current clock determined from a carry value cin for correction of a previous clock;
   outputting a modulus which is signed in the modular multiplication based on the carry input value and a sign bit of the multiplicand; and
   receiving the signed multiplicand and the signed modulus, and calculating a result value of the modular multiplication by iteratively performing a full addition operation on a carry value C and a sum value S of the full addition operation, found at the previous clock.

10. The method of claim 9, wherein outputting a signed multiplicand comprises:
    receiving two least significant bits of the multiplier and a predetermined reference bit while sequentially shifting bits of the multiplier, and performing the Booth conversion thereon.

11. The method of claim 10, wherein outputting of a signed multiplicand comprises:
    performing the Booth conversion using the two least significant bits of the multiplier and the reference bit;
    multiplexing the multiplicand based on the two least significant bits of the multiplier; and
    outputting the signed multiplicand by selectively performing the one's complementary operation on the output of the multiplexed multiplicand based on a sign bit of the Booth conversion result.

12. The method of claim 10, wherein finding of a carry input value Carry-in comprises:
    outputting the carry input value Carry-in by performing a full addition operation using the carry value cin for correction and the sign bit of the multiplicand.

13. The method of claim 9, further comprising performing a carry propagation addition operation on the carry value and the sum value after (m+2) clocks, where m=n/2, when each of the multiplier, the multiplicand and the modulus has n bits.

14. The method of claim 13, further comprising adding the modulus to the carry propagation addition operation result, when a result of the carry propagation addition operation is a negative value.

15. The apparatus of claim 3, wherein the first logic outputs the signed multiplicand by selectively performing the one's complementary operation on the output of the multiplexed multiplicand based on a sign bit of the Booth conversion result.

16. The method of claim 9, wherein the full addition operation is performed using at least two Carry Save Adders (CSAs) each including a plurality of full adders.

17. The method of claim 9, wherein outputting a signed modulus comprises:
    extracting, at every clock, as many first bit values as a predetermined number of bits beginning from a least significant bit for each of the carry value and the sum value;
    outputting second bit values for determining a multiple of modular reduction in the modular multiplication based on the first bit values, the carry input value Carry-in and a sign bit of the multiplicand; and selecting the signed modulus based on the second bit values.

18. The method of claim 9, wherein outputting a signed multiplicand comprises:

outputting the signed multiplicand by selectively performing the one's complementary operation on the output of the multiplexed multiplicand based on a sign bit of the Booth conversion result.

* * * * *